United States Patent
Okano et al.

(10) Patent No.: US 11,505,242 B2
(45) Date of Patent: *Nov. 22, 2022

(54) VEHICLE STEERING CONTROL SYSTEM

(71) Applicant: TOYOTA JIDOSHA KABUSHIKI KAISHA, Toyota (JP)

(72) Inventors: Takahiro Okano, Chiryu (JP); Kenji Shibata, Nagoya (JP); Takenari Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

This patent is subject to a terminal disclaimer.

(21) Appl. No.: 16/388,358

(22) Filed: Apr. 18, 2019

(65) Prior Publication Data

US 2019/0322312 A1 Oct. 24, 2019

(30) Foreign Application Priority Data

Apr. 23, 2018 (JP) .............................. JP2018-082556

(51) Int. Cl.
  *B62D 6/00* (2006.01)
  *G07C 5/08* (2006.01)
  *B62D 15/02* (2006.01)

(52) U.S. Cl.
  CPC ............. *B62D 6/00* (2013.01); *B62D 15/025* (2013.01); *G07C 5/0808* (2013.01)

(58) Field of Classification Search
  CPC ...... B62D 6/00; B62D 15/025; B62D 5/0463; B62D 5/0481; G07C 5/0808
  See application file for complete search history.

(56) References Cited

U.S. PATENT DOCUMENTS

| 2007/0165910 | A1* | 7/2007 | Nagaoka | ............... | B60W 40/04 382/104 |
|---|---|---|---|---|---|
| 2014/0172236 | A1 | 6/2014 | Nishikawa et al. | | |
| 2016/0121906 | A1* | 5/2016 | Matsuno | ............. | G05D 1/0088 701/23 |
| 2016/0176440 | A1 | 6/2016 | Witte et al. | | |
| 2018/0208235 | A1 | 7/2018 | Miyashita | | |

(Continued)

FOREIGN PATENT DOCUMENTS

| CN | 105711640 A | 6/2016 |
|---|---|---|
| JP | 2009-056820 A | 3/2009 |

(Continued)

OTHER PUBLICATIONS

Office Action dated Jun. 9, 2021 in U.S. Appl. No. 16/388,991.

(Continued)

*Primary Examiner* — Rachid Bendidi
(74) *Attorney, Agent, or Firm* — Sughrue Mion, PLLC

(57) ABSTRACT

A steering system of a vehicle, including an operation member to be operated by a driver, a steering device configured to steer a wheel, and a controller configured to control the steering system, wherein the controller is configured to parallelly execute a main process including a process in which the controller controls the steering device to perform steering in accordance with an operation of the operation member and an auxiliary process relating to an operation of the steering system and configured to change an execution ratio of the main process and an execution ratio of the auxiliary process.

20 Claims, 4 Drawing Sheets

(56) References Cited

U.S. PATENT DOCUMENTS

| | | | |
|---|---|---|---|
| 2018/0316895 A1* | 11/2018 | McClelland | G07C 5/02 |
| 2019/0009794 A1* | 1/2019 | Toyoda | B60W 50/10 |
| 2019/0284921 A1* | 9/2019 | Xue | G06Q 30/0283 |
| 2019/0322314 A1 | 10/2019 | Shibata et al. | |

FOREIGN PATENT DOCUMENTS

| | | |
|---|---|---|
| JP | 2010-036806 A | 2/2010 |
| JP | 2013-28312 A | 2/2013 |
| WO | 2017/022006 A1 | 2/2017 |

OTHER PUBLICATIONS

Office Action dated Dec. 8, 2021 in U.S. Appl. No. 16/388,991.
Office Action dated Mar. 17, 2022 in U.S. Appl. No. 16/388,991.
U.S. Appl. No. 16/388,991, filed Apr. 19, 2019 (Shibata et al.).
Notice of Allowance dated Jun. 27, 2022 in U.S. Appl. No. 16/388,991.
Supplemental Notice of Allowability dated Sep. 6, 2022 in U.S. Appl. No. 16/388,991.

* cited by examiner

VEHICLE STEERING CONTROL SYSTEM

CROSS REFERENCE TO RELATED APPLICATION

The present application claims priority from Japanese Patent Application No. 2018-082556, which was filed on Apr. 23, 2018, the disclosure of which is herein incorporated by reference in its entirety.

BACKGROUND

Technical Field

The following disclosure relates to a steering system in which steering of a wheel in accordance with an operation of an operation member by a driver is achieved by a steering device.

Description of Related Art

A steering system described in Japanese Patent Application Publication No. 2010-36806, for instance, is proposed in the field of vehicle steering systems. A controller in the steering system is configured to execute two processes, i.e., a process of controlling a steering torque (which is one sort of a main process) and a failure diagnosis process of diagnosing a failure of the controller (which is one sort of an auxiliary process). In the steering system, the controller executes the failure diagnosis process on a higher priority basis than the process of controlling the steering torque.

SUMMARY

A steering system in which steering of a wheel in accordance with an operation of the operation member is performed by a steering device under control of the controller, namely, what is called steer-by-wire steering system, has been actively developed in recent years. The controller in such a steering system suffers from a relatively heavy load in a process in which the controller controls the steering device to perform the steering of the wheel in accordance with the operation of the operation member. (The process will be hereinafter referred to as "steering process" where appropriate). Thus, in the case where the controller executes both of the main process including the steering process and the auxiliary process relating to an operation of the steering system, the problem of the load on the controller is serious. The problem is not solved by the conventional technique of executing the auxiliary process on a higher priority basis described in the above Publication. An attempt to solve the problem by use of a high-performance controller inevitably pushes up a cost of the steering system, so that the steering system equipped with such a controller does not have high utility. Accordingly, the present disclosure is directed to a steer-by-wire steering system having high utility.

In one aspect of the disclosure, a steering system includes a controller configured to parallelly execute a main process including a process in which the controller controls a steering device to perform steering of a wheel in accordance with an operation of an operation member and an auxiliary process relating to an operation of the steering system and configured to change an execution ratio of the main process and an execution ratio of the auxiliary process.

Advantageous Effects

According to the steering system of the disclosure, the execution ratio of the main process and the execution ratio of the auxiliary process in the controller are changed depending on circumstances, for instance, so as to prevent a processing load of the controller from becoming excessive. Thus, the steering system having high utility is constructed.

Forms of the Invention

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

(1) A steering system of a vehicle, comprising an operation member to be operated by a driver, a steering device configured to steer a wheel, and a controller configured to control the steering system, wherein the controller is configured to parallelly execute a main process including a process in which the controller controls the steering device to perform steering of the wheel in accordance with an operation of the operation member and an auxiliary process relating to an operation of the steering system and configured to change an execution ratio of the main process and an execution ratio of the auxiliary process.

The "controller" in this form is an ordinary device whose main constituent element is a computer including a processor, a RAM, a ROM, and so on. Here, an amount of all processes executed by the controller per unit time is defined as an overall processing amount. In this case, the "execution ratio of the main process" and the "execution ratio of the auxiliary process" in the controller are respectively regarded as a ratio of a processing amount of the main process to the overall processing amount and a ratio of a processing amount of the auxiliary process to the overall processing amount. The execution ratio may be referred to as a processing load, a processing burden or the like of the controller in each of the main process and the auxiliary process. As later explained, the processing load of the controller is prevented from becoming excessive by changing the execution ratio of the main process and the execution ratio of the auxiliary process depending on circumstances. In the case where the main process needs to be executed with high accuracy, the execution ratio of the main process is increased. On the other hand, in the case where the main process may be simply executed, the execution ratio of the main process is decreased. Further, in the case where it is significant to thoroughly execute the auxiliary process, the execution ratio of the auxiliary process is increased. On the other hand, in the case where there is not much merit in executing the auxiliary process, the execution ratio of the auxiliary process is decreased.

Though the controller executes the main process and the auxiliary process generally in a time division manner, there is an upper limit in the overall processing amount of the controller as a whole. From the viewpoint of making the most of the overall processing amount, the controller is desirably execute, all the times, the processes such that the overall processing amount is close to the upper limit. In the case where the controller executes the processes to such an extent that the overall processing amount is close to the upper limit, an increase in the execution ratio of the main process results in a decrease in the execution ratio of the auxiliary process, and an increase in the execution ratio of the auxiliary process results in a decrease in the execution ratio of the main process.

In the case where the controller includes a plurality of control units each including a computer, each of the plurality of control units may change the execution ratio of the main process and the execution ratio of the auxiliary process. Alternatively, only at least one control unit, as a part of the plurality of control units, may change the execution ratio of the main process and the execution ratio of the auxiliary process. In either configuration, the execution ratio of the main process and the execution ratio of the auxiliary process in the controller as a whole are changed. Further, the execution ratio of the main process or the execution ratio of the auxiliary process may be 0 irrespective of whether the execution ratios are those in the controller as a whole or the execution ratios are those in each control unit. That is, the execution ratio of the main process and the execution ratio of the auxiliary process may be changed such that one of the main process and the auxiliary process is not to be executed in the controller as a whole or in each control unit.

In the case where the execution ratio of the main process and the execution ratio of the auxiliary process are changed, a time period for which each process is executed may be changed by changing details of each process or the number of executions of each process per unit time may be changed without changing details of each process.

The "process in which the controller controls the steering device to perform steering of the wheel in accordance with the operation of the operation member" included in the main process is a basic process in the steer-by-wire steering system. (This process will be hereinafter referred to as "steering process" where appropriate.) For instance, the process is a control process for controlling the steering device such that a steering angle of the wheel becomes equal to an angle that corresponds to an operating angle of a steering wheel as the operation member. The steer-by-wire steering system is often equipped with a reaction force actuator configured to give an operation reaction force to the operation member for making a steering feeling felt by a driver appropriate one. The main process may include, in addition to the steering process, a process for controlling an operation reaction force generated by the reaction force actuator and other processes in association with the steering process. (The process for controlling the operation reaction force will be hereinafter referred to as "reaction force process" where appropriate.) As later explained, the execution ratio of the main process should be high in a situation in which high controllability is required for the steering of the wheel while the execution ratio of the main process may be low in a situation in which controllability to be required for the steering of the wheel is not so high. In this respect, the "high controllability" is a concept including high accuracy, good response, and the like.

The auxiliary process relating to the operation of the steering system is not directly relevant to the operation of the steering system, and the sort of the auxiliary process is not limited. For instance, the auxiliary process includes a process of confirming soundness of the steering system. Specifically, the auxiliary process includes a breakdown-tendency recognition process of recognizing that the steering system has a tendency to break down, a system appropriateness determining process of determining whether or not the steering system is in a state in which the steering of the wheel can be appropriately performed, and so on, as later explained. The execution ratio of the auxiliary process is desirably made high in a situation in which the accuracy of the control executed in the main process is not disturbed. It may be possible to increase the execution ratio of the auxiliary process only in a situation in which the auxiliary process is effective.

(2) The steering system according to the form (1), wherein the auxiliary process includes a breakdown-tendency recognition process of recognizing that the system has a tendency to break down.

This form includes limitation as to the sort of the auxiliary process. The "breakdown-tendency recognition process" may include an urgent process for detecting that an electric failure or the like is occurring in the steering system right now. In the case where the steering system is configured to change the execution ratio of the auxiliary process, the breakdown-tendency recognition process preferably includes, as a principal process, a process of recognizing that the steering system will probably break down after a lapse of a certain time if the steering system keeps operating. For instance, as the breakdown-tendency recognition process, there may be preferably employed a process of recognizing a condition of the steering system that is not so serious and urgent, such as a condition of fatigue of constituent components of the steering device, the reaction force actuator and the like. In a steer-by-wire steering system in which the wheel is steered by a force of a drive source of the steering device without depending on the operation force applied to the operation member by the driver, it is particularly meaningful to recognize the tendency of the breakdown of the steering device.

(3) The steering system according to the form (2), wherein the breakdown-tendency recognition process includes a process of determining that the system has the tendency to break down based on cumulative application of an external force that leads to a breakdown of the steering system.

This form is effective in the case where the breakdown-tendency recognition process is the process of recognizing the condition of fatigue of the constituent components described above. Here, an external force that may lead to the breakdown of the steering system is referred to as "excessive input". Repeated application of the excessive input causes damage to the constituent components of the steering system due to fatigue. Accumulation of the fatigue by the repeated application of the excessive input increases the probability of breakdown of the system. In view of the phenomenon, this form enables recognition of an increase in the possibility of breakdown of the system based on cumulative application of the excessive input, for instance.

(4) The steering system according to any one of the forms (1) through (3), wherein the auxiliary process includes a system appropriateness determining process of determining whether or not the steering system is in a state in which the steering of the wheel is appropriately performed.

There may be cases in which the steering of the wheel in accordance with the operation of the operation member is not performed due to some reason though the system is not broken down. For instance, a case is expected in which the operation amount of the operation member and the steering amount of the wheel differ from each other beyond a certain degree. Further, in an arrangement in which a plurality of sensors having the same function are provided as a redundant system, a case is expected in which detection values of the sensors differ from one another beyond a certain degree. In this form, a process of confirming the presence or absence of such cases is executed as the auxiliary process. In this respect, such cases may be regarded as cases that occur when the steering system is already suffering from the breakdown. Thus, the system appropriateness determining process may be regarded as one sort of a system breakdown determining process.

(5) The steering system according to any one of the forms (1) through (4), wherein the controller is configured to change the execution ratio of the main process and the execution ratio of the auxiliary process based on at least one of an operating state of the steering system, a surrounding environment of the vehicle, and a running state of the vehicle.

This form specifies a status for determining in which situation the execution ratio of the main process should be increased or decreased, conversely, in which situation the execution ratio of the auxiliary process should be decreased or increased. The "operating state of the steering system" indicates the steering amount by which the wheel is being steered, a magnitude of a force that the steering device is exerting for steering the wheel, and so on. The "surrounding state of the vehicle" indicates whether the road on which the vehicle travels is a rough road, whether an obstacle such as a curb is present in the vicinity of the vehicle, and so on. The "running state of the vehicle" indicates the running speed of the vehicle, a degree of severity with which the vehicle is turning and which is represented by lateral acceleration, a yaw rate or the like (i.e., a degree of lateral acceleration, a yaw rate or the like that is being generated in the vehicle), and so on. On the basis of at least one of the statuses, the execution ratio of the main process and the execution ratio of the auxiliary process can be effectively changed.

(6) The steering system according to any one of the forms (1) through (5), wherein the controller is configured to increase the execution ratio of the main process when a running speed of the vehicle is not lower than a threshold speed.

This form is one example of a form for increasing the execution ratio of the main process based on the running state of the vehicle. In the case where the running speed of the vehicle is high, accurate steering is demanded. Further, in the case where the running speed of the vehicle is high, a steering operation in which the steering amount abruptly becomes large is not expected. Moreover, it is likely that the road surface on which the vehicle travels when running at a higher speed is relatively good, and it is thus considered that there is a low possibility of application of a large external input to the steering device. In view of this, execution of the auxiliary process including the breakdown-tendency recognition process is not so meaningful when the running speed of the vehicle is high. Thus, the execution ratio of the main process is increased according to this form for enhancing controllability of the steering of the wheel.

(7) The steering system according to any one of the forms (1) through (6), wherein the controller is configured to increase the execution ratio of the main process when the vehicle is running straightforward.

This form is one example of a form for increasing the execution ratio of the main process based on the running state of the vehicle or based on the operating state of the steering system. In the case where the steering operation starts in a state in which the vehicle is running straightforward, relatively high response is demanded for the steering of the wheel. On the other hand, because the wheel is not being steered in straightforward running of the vehicle, execution of the auxiliary process including the breakdown-tendency recognition process is not so meaningful. In view of this, the execution ratio of the main process is increased when the vehicle is running straightforward.

(8) The steering system according to any one of the forms (1) through (7),
wherein the auxiliary process includes a breakdown-tendency recognition process of recognizing that the system has a tendency to break down, and
wherein the controller is configured to increase the execution ratio of the auxiliary process in a situation in which it is expected that there is a possibility of application of an external force that leads to a breakdown of the steering system.

As explained above, the repeated application of the excessive input to the constituent elements of the steering system such as the steering device increases the probability of breakdown of the steering system after a lapse of a considerable time period. According to this form, the execution ratio of the auxiliary process including the breakdown-tendency recognition process is increased in a situation in which it is expected that there is a possibility of application of the external force that leads to the breakdown of the steering system. The situation will be hereinafter referred to as "excessive input situation" where appropriate.

(9) The steering system according to any one of the forms (1) through (8), wherein the controller is configured to increase the execution ratio of the main process in a high-controllability required situation in which high controllability is required for the steering of the wheel.

The "controllability" in this form is a concept including the accuracy of the steering of the wheel, the response of the steering, and so on. The "high controllability" means that the steering amount of the wheel with respect to an amount of a steering operation is accurate, a delay of the steering of the wheel with respect to the steering operation is small, and so on. According to this form, the execution ratio of the main process that includes the steering process as a principal process can be increased in the high-controllability required situation in which high controllability is required.

In relation to the form described above, there is considered a case where the system is in the excessive input situation and the high-controllability required situation. In such a case, a determination as to which one of the execution ratio of the main process and the execution ratio of the auxiliary process should be increased may be made in advance in view of characteristics to be attained by the steering system, the structure of the steering system, etc. If the execution ratio of the main process is configured to be increased in the case where the system is in the excessive input situation and the high-controllability required situation, this form may be regarded as a form in which the execution ratio of the auxiliary process is increased on condition that the system is not in the high-controllability required situation.

(10) The steering system according to any one of the forms (1) through (9),
wherein the controller is configured to be operable in a first mode and operable in a second mode in which the execution ratio of the main process is set to be lower than that in the first mode and the execution ratio of the auxiliary process is set to be higher than that in the first mode, and
wherein the controller is configured to switch an operation mode thereof between the first mode and the second mode.

Although the execution ratio of the main process and the execution ratio of the auxiliary process may be continuously changed, the execution ratios may be set to respective specific values. As recited in this form, two mutually different set execution ratios may be determined for each of the main process and the auxiliary process. Further, as the operation mode of the controller, the first mode may be set such that the execution ratio of the main process is equal to a higher one of the two set execution ratios while the execution ratio of the auxiliary process is equal to a lower one of the two set execution ratios, and the second mode may be set such that the execution ratio of the main process is equal to a lower one of the two set execution ratios while the execution ratio of the auxiliary process is equal to a higher one of the two set execution ratios. By switching the operation mode of the controller between the thus set first and second modes, the execution ratios of the main process and the auxiliary process can be simply changed depending on circumstances.

(11) The steering system according to any one of the forms (1) through (10), wherein the controller is configured to change the execution ratio of the main process and the execution ratio of the auxiliary process by changing at least one of details of the main process and details of the auxiliary process.

This form is a form in which the execution ratios of the main process and the auxiliary process are changed by changing at least one of details of the main process and details of the auxiliary process between comparatively advanced one and comparatively simple one. Here, in the case where one certain process is repeatedly executed, a time taken by the controller for executing the one process is referred to as an execution cycle time. Further, in the case where the controller collectively executes various processes (that should be executed), a time pitch at which a set of the processes is repeated is referred to as an execution pitch. According to this form, by changing the execution cycle time of at least one of the main process and the auxiliary process, the execution ratios of the main process and the auxiliary process can be effectively changed without changing the execution pitch. Though not belonging to this form, it is possible to change the execution ratios of the main process and the auxiliary process by changing the number of times of executions of each of the main process and the auxiliary process within the execution pitch, without changing details of each of the main process and the auxiliary process, namely, without changing the execution cycle time of one of the main process and the auxiliary process.

(12) The steering system according to the form (11), wherein the controller is configured to selectively execute, as at least a part of the main process, one of: a first steering process in which the controller controls the steering device to perform the steering of the wheel based on detection by a plurality of sensors; and a second steering process in which the controller controls the steering device to perform the steering of the wheel based on detection by a part of the plurality of sensors, and wherein the controller is configured to execute the first steering process when increasing the execution ratio of the main process and to execute the second steering process when decreasing the execution ratio of the main process.

This form is a form in which the execution ratio of the main process is changed by chaining the details of the main process including the steering process. As later explained in detail, if the steering control is executed using two sensors that are mutually replaceable by conversion of respective detection values, for instance, the time for which the controller executes the control process is long whereas the accuracy of the steering of the wheel is high. On the other hand, if the steering control is executed using only one of the two sensors, the accuracy of the steering of the wheel is somewhat lowered whereas the time for which the controller executes the control process is shortened because the control process is simplified. That is, it is possible to reduce the load of the controller by execution of the control process.

(13) The steering system according to the form (12), wherein the controller is configured not to execute the second steering process when the steering system is in a state in which a difference between the steering of the wheel by the first steering process and the steering of the wheel by the second steering process is out of a permissible range.

This form includes limitation as to a condition for prohibiting the second steering process. As explained above, the accuracy of the steering of the wheel may be inevitably lowered in the second steering process which is a relatively simple control process using the smaller number of sensors. In view of this, execution of the second steering process is prohibited according to this form when the accuracy of the steering becomes lower beyond a certain degree. In other words, the execution ratio of the main process is prohibited from being decreased. The difference between the steering of the wheel by the first steering process and the steering of the wheel by the second steering process may be estimated based on consistency of detection values of the respective sensors, namely, based on a variation among detection values of the respective sensors.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
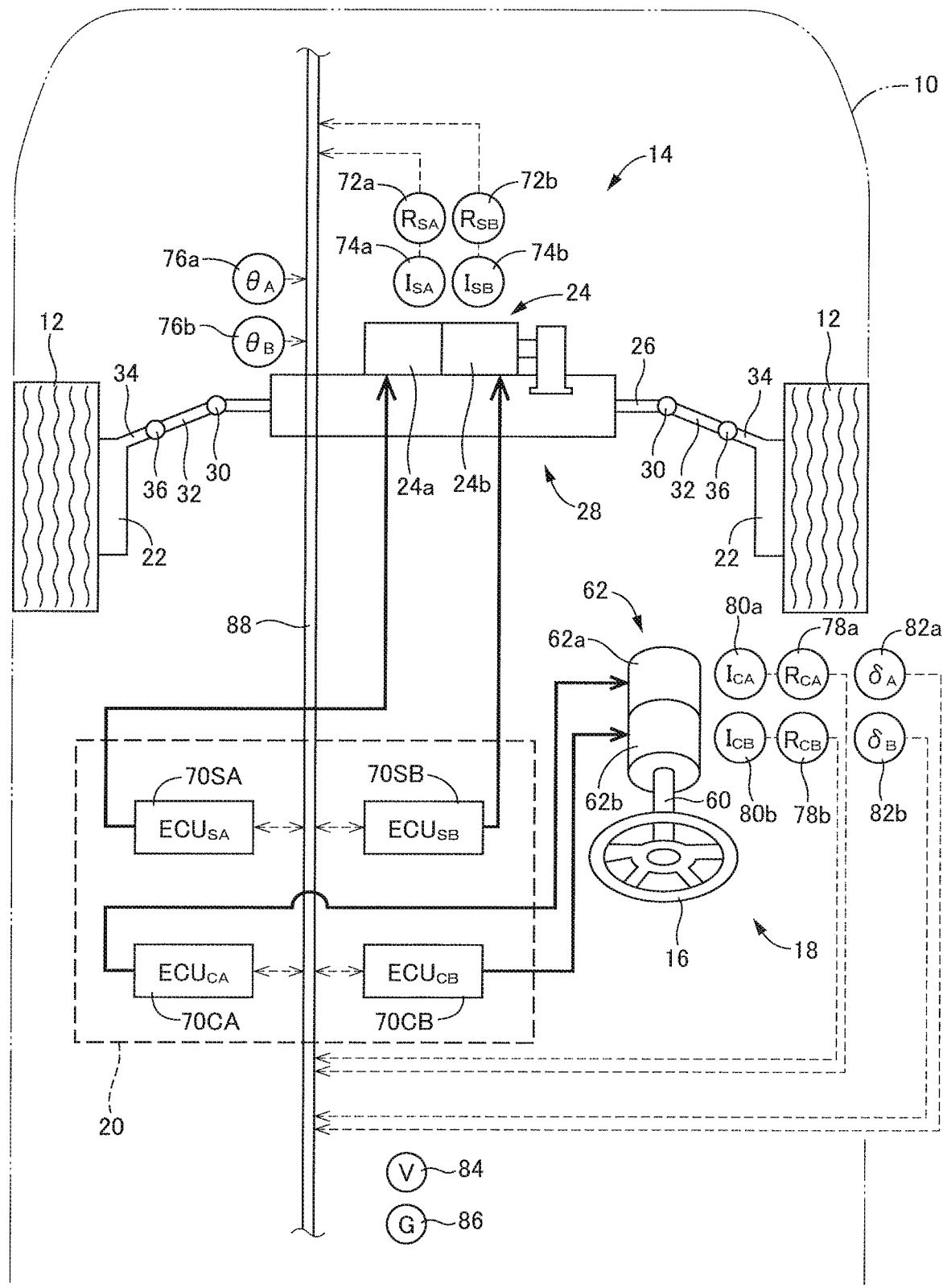
FIG. 1 is a schematic view illustrating an overall structure of a steering system according to one embodiment.

Referring to the drawings, there will be explained below in detail a steering system according to one embodiment of the claimable invention. It is to be understood that the claimable invention is not limited to the details of the following embodiment but may be embodied based on the forms described in Forms of the Invention and may be changed and modified based on the knowledge of those skilled in the art.

[A] Structure of Steering System i) Overall Structure

As schematically illustrated in FIG. 1, a steering system according to one embodiment is configured to steer front right and left wheels 12 of a vehicle 10. The steering system includes a steering device 14 configured to steer the wheels 12, an operation device 18 including a steering wheel 16, as an operation member, to be operated by a driver, and a controller 20 configured to control the steering device 14 to perform steering of the wheels 12 in accordance with an operation of the steering wheel 16.

Each wheel 12 is rotatably held by a corresponding steering knuckle 22 that is pivotably supported by a vehicle body via a corresponding suspension apparatus. The steering device 14 includes: a steering actuator 28 including an electric motor 24 as a drive source and configured to move a steering rod 26 in a right-left direction; and link rods 32, one end of each of which is coupled to a corresponding one of opposite ends of the steering rod 26 via a ball joint 30. The other end of each link rod 32 is coupled, via a ball joint 36, to a knuckle arm 34 of the corresponding steering knuckle 22. The steering knuckles 22 are pivoted by a rightward and leftward movement of the steering rod 26, whereby the wheels 12 are steered.

ii) Structure of Steering Device

Figure 2:
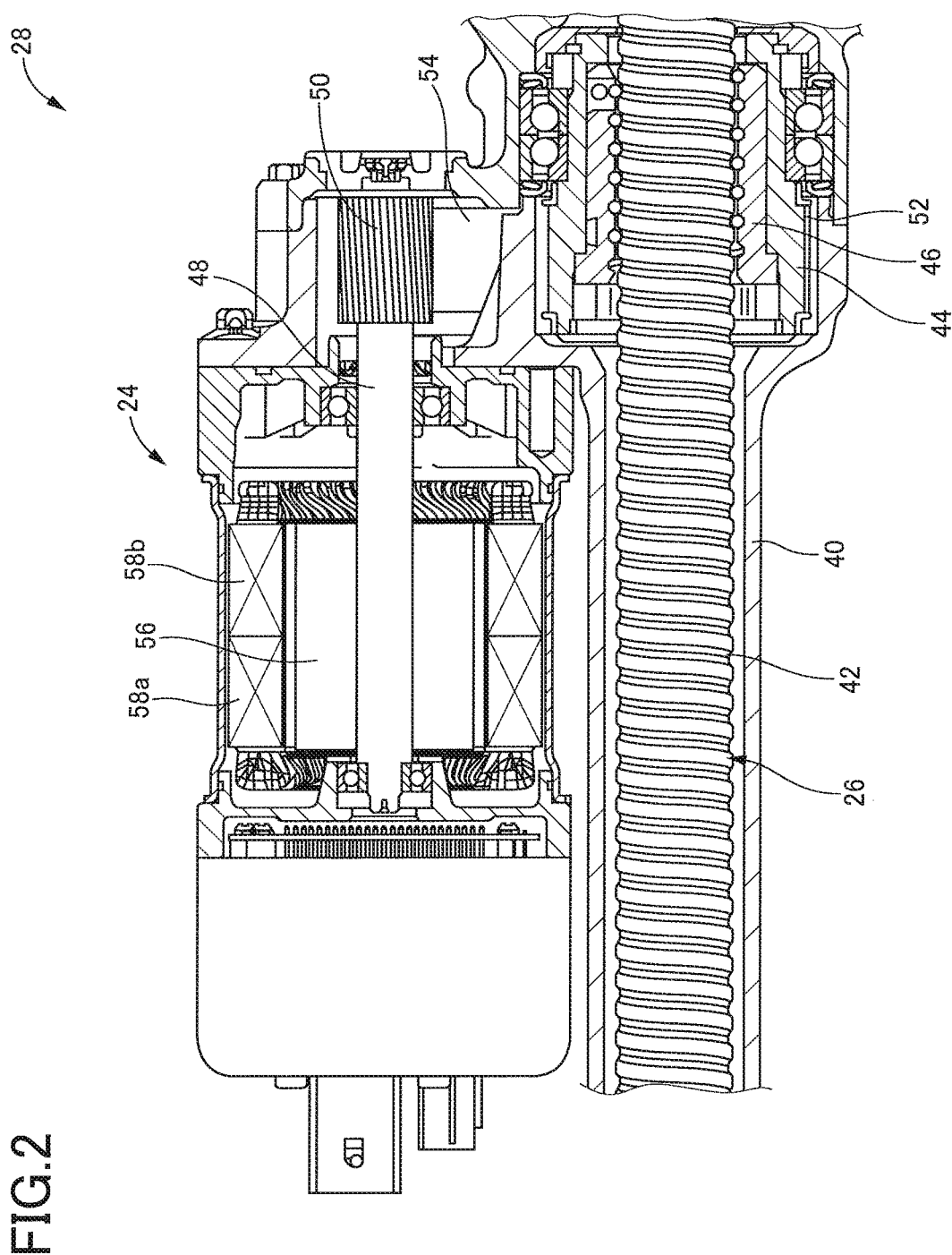
FIG. 2 is a cross-sectional view of a steering actuator of a steering device in the steering system illustrated in FIG. 1.

Referring also to FIG. 2, the steering actuator 28 of the steering device 14 will be explained. As shown in FIG. 2, the steering actuator 28 holds, in its housing 40, the steering rod 26 such that the steering rod 26 is unrotatable about an axis thereof and such that the steering rod 26 is movable in the right-left direction. A threaded groove 42 is formed on an outer circumference of the steering rod 26. A holding sleeve 44 is held in the housing 40 so as to be rotatable about an axis thereof and so as to be immovable in the right-left direction. A nut 46 holding bearing balls is fixedly held by the holding sleeve 44. The nut 46 and the steering rod 26 are threadedly engaged with each other and constitute a ball screw mechanism. The electric motor 24 is disposed outside the housing 40 such that its axis is parallel to an axis of the steering rod 26. (The electric motor 24 will be hereinafter referred to as "steering motor 24" where appropriate to distinguish from other electric motor.) A timing pulley 50 is attached to a distal end of a motor shaft 48 of the steering motor 24. Like the timing pulley 50, the holding sleeve 44 includes engaging teeth 52 formed on its outer circumference. Thus, the holding sleeve 44 functions as another timing pulley that is paired with the timing pulley 50. A timing belt 54 is wound around the holding sleeve 44 and the timing pulley 50. Rotation of the steering motor 24, strictly, rotation of the motor shaft 48, causes the nut 46 to rotate, so that the steering rod 26 is moved rightward or leftward in accordance with the rotational direction of the steering motor 24.

The steering motor 24 is a three-phase, brushless DC motor and includes two systems. Specifically, magnets 56 common to the two systems are fixed to an outer circumference of the motor shaft 48 so as to be arranged in the circumferential direction, and two coil sets corresponding to the respective two systems, i.e., a set of coils 58a and a set of coils 58b, are disposed so as to be opposed to the magnets 56. The steering motor 24 is rotated by supplying electric current to one of or both of the two sets of coils 58a, 58b. A torque generated by the steering motor 24, namely, a force that moves the steering rod 26 in the right-left direction, is generally proportional to a sum of the electric currents supplied to the coils 58a, 58b. Because the steering motor 24 is a two-system motor, the steering actuator 28 may be assumed to have two electric motors. In this case, as shown in FIG. 1, portions of the steering motor 24 corresponding to the respective two systems will be hereinafter referred to as a steering motor 24a and a steering motor 24b for convenience sake. Accordingly, the steering motors 24a, 24b are regarded as two drive sources of the steering device 14.

iii) Structure of Operation Device

As shown in FIG. 1, the operation device 18 includes the steering wheel 16, a steering shaft 60 fixed to the steering wheel 16 and rotatable together with the steering wheel 16, and an electric motor 62. A motor shaft of the electric motor 62 is integral with the steering shaft 60, and the electric motor 62 applies or imparts a rotational torque to the steering wheel 16. The rotational torque functions as a reaction force (operation reaction force) with respect to an operation of the steering wheel 16 by the driver, i.e., a steering operation. Accordingly, the electric motor 62 will be hereinafter referred to as "reaction force motor 62". The reaction force motor 62 constitutes a reaction force actuator.

Though a detailed structure of the reaction force motor 62 is not illustrated, the reaction force motor 62 is a two-system, brushless DC motor, like the steering motor 24. Accordingly, the operation device 18 may be assumed to have two electric motors. In this case, as shown in FIG. 1, portions of the reaction force motor 62 corresponding to the respective two systems will be hereinafter referred to as a reaction force motor 62a and a reaction force motor 62b for convenience sake. The operation reaction force functions as a force for returning the steering wheel 16 to a neutral position (at which the steering wheel 16 is operated neither rightward nor leftward). The operation reaction force is generated by supplying electric current to one of or both of the reaction force motors 62a, 62b. The operation reaction force has a magnitude generally proportional to a sum of the electric currents supplied to the reaction force motors 62a, 62b.

iv) Configuration of Controller

As shown in FIG. 1, the controller 20 configured to control the steering system includes four electronic control units (ECU) 70SA, 70SB, 70CA, 70CB. The ECUs 70SA, 70SB, 70CA, 70CB are respectively indicated in FIG. 1g as [ECU$_{SA}$], [ECU$_{SB}$], [ECU$_{CA}$], [ECU$_{CB}$]. In the following explanation, a term "ECU 70" is used as a general term for each of the four ECUs 70SA, 70SB, 70CA, 70CB when it is not necessary to distinguish the four ECUs from one another.

The ECUs 70SA, 70SB control the steering device 14. Specifically, according to the two systems, the ECU 70SA controls the steering motor 24a of the steering actuator 28 while the ECU 70SB controls the steering motor 24b of the steering actuator 28. Each of the ECUs 70SA, 70SB is constituted by a computer including a CPU, a ROM, a RAM, etc., and an inverter as a drive circuit (driver) of a corresponding one of the steering motor 24a and the steering motor 24b. While not illustrated, the inverter of each ECU 70SA, 70SB is connected to a power source and supplies, to the corresponding one of the steering motor 24a and the steering motor 24b, a drive current based on a command of the computer. The steering motors 24a, 24b to which the drive current is supplied are operated by the drive current. In other words, the steering device 14 to which the drive current is supplied is operated by the drive current. In the following explanation, the ECUs 70SA, 70SB will be referred to as steering ECUs 70SA, 70SB, and a term "steering ECU 70S" is used as a general term for each of the steering ECUs 70SA, 70SB when it is not necessary to distinguish the steering ECUs 70SA, 70SB from each other.

The ECUs 70CA, 70CB control the operation device 18. Specifically, according to the two systems, the ECU 70CA controls the reaction force motor 62a while the ECU 70CB controls the reaction force motor 62b, like the ECUs 70SA, 70SB. Each of the ECUs 70CA, 70CB is constituted by a computer including a CPU, a ROM, a RAM, etc., and an inverter as a drive circuit (driver) of a corresponding one of the reaction force motor 62a and the reaction force motor 62b. While not illustrated, the inverter of each ECU 70CA, 70CB is connected to a power source and supplies, to the corresponding one of the reaction force motor 62a and the reaction force motor 62b, electric current based on a command of the computer. In the following explanation, the ECUs 70CA, 70CB will be referred to as reaction force ECUs 70CA, 70CB, and a term "reaction force ECU 70C" is used as a general term for each of the reaction force ECUs 70CA, 70CB when it is not necessary to distinguish the two reaction force ECUs 70CA, 70CB from each other.

The steering motors 24a, 24b respectively include rotation angle sensors 72a, 72b (each of which is a resolver, an encoder or the like) and current sensors 74a, 74b for detecting electric current passing therethrough. Each rotation angle sensor 72a, 72b is configured to detect a relative phase between the magnets 56 attached to the motor shaft 48 and the coils 58a or the coils 58b (which may be referred to as "electrical angle"), namely, the rotation angle of the motor shaft 48. The steering actuator 28 includes two steering amount sensors 76a, 76b (corresponding to the two systems) each for detecting a steering amount. The steering amount may be considered as representing a steering angle of the wheels 12. The steering amount is an amount of the movement of the steering rod 26 in the right-left direction from its neutral position. Similarly, the reaction force motors 62a, 62b respectively include the rotation angle sensors 78a, 78b each for detecting the rotation angle of the motor shaft of the corresponding reaction force motor 62a, 62b and current sensors 80a, 80b for detecting electric current passing therethrough. The operation device 18 includes two operation amount sensors 82a, 82b (corresponding to the two systems) each for detecting an operation amount in the steering operation. The operation amount is a rotation angle of the steering wheel 16 from its neutral position. The vehicle 10 is further equipped with a vehicle speed sensor 84 for detecting a running speed of the vehicle 10 and a lateral acceleration sensor 86 for detecting lateral acceleration being generated in the vehicle 10. In FIG. 1, the rotation angle sensors 72a, 72b, the current sensors 74a, 74b, the steering amount sensors 76a, 76b, the rotation angle sensors 78a, 78b, the current sensors 80a, 80b, the operation amount sensors 82a, 82b, the vehicle speed sensor 84, and the lateral acceleration sensor 86 are respectively indicated as $[R_{SA}]$, $[R_{SB}]$, $[I_{SA}]$, $[I_{SB}]$, $[\theta_A]$, $[\theta_B]$, $[R_{CA}]$, $[R_{CB}]$, $[I_{CA}]$, $[I_{CB}]$, $[I_{CA}]$, $[I_{CB}]$, $[\delta_A]$, $[\delta_B]$, $[v]$, $[G]$.

The vehicle 10 is equipped with a car area network or controllable area network (CAN) 88. The ECUs 70SA, 70SB, 70CA, 70CB are connected to the CAN 88 so as to be communicable with one another. The rotation angle sensors 72a, 72b, the current sensors 74a, 74b, the steering amount sensors 76a, 76b, the rotation angle sensors 78a, 78b, the current sensors 80a, 80b, the operation amount sensors 82a, 82b, the vehicle speed sensor 84, and the lateral acceleration sensor 86 are also connected to the CAN 88. Each ECU 70 receives detection signals of the corresponding sensors via the CAN 88 and controls the electric current to be supplied to the corresponding steering motor 24a, 24b or the corresponding reaction force motor 62a, 62b, based on detection values indicated by the received detection signals.

[B] Processes Executed by Controller

The steering system executes: a main process for controlling the steering device 14 and the operation device 18; and an auxiliary process relating to the operations of the steering system. There will be hereinafter explained details of the main process, details of the auxiliary process, an operation mode of the controller 20 relating to execution of the processes.

i) Main Process

The main process includes a steering process executed by each of the steering ECUs 70SA, 70SB and a reaction force process executed by each of the reaction force ECUs 70CA, 70CB. The steering process is a control process in which each steering ECU 70SA, 70SB controls the steering device 14 to perform the steering of the wheels 12 in accordance with the operation of the steering wheel 16. There are prepared, as the steering process, a first steering process and a second steering process that are to be selectively executed. The reaction force process is a control process in which each reaction force ECU 70CA, 70CB controls a corresponding one of the reaction force motors 62a, 62b to give, to the steering wheel 16, the operation reaction force in accordance with the operation amount. The steering process and the reaction force process will be hereinafter explained in detail.

For the steering of the wheels 12, there are provided two steering-related systems: a system including the steering ECU 70SA, the steering motor 24a, the operation amount sensor 82a, and the steering amount sensor 76a; and a system including the steering ECU 70SB, the steering motor 24b, the operation amount sensor 82b, and the steering amount sensor 76b. In the normal condition, the two steering-related systems concurrently perform the steering of the wheels 12 such that the steering motors 24a, 24b equally generate a torque. Similarly, for the application of the operation reaction force, there are provided two reaction-force-related systems: a system including the reaction force ECU 70CA, the reaction force motor 62a, and the operation amount sensor 82a; and a system including the reaction force ECU 70CB, the reaction force motor 62b, and the operation amount sensor 82b. In the normal condition, the two reaction-force-related systems concurrently perform the application of the operation reaction force such that the reaction force motors 62a, 62b equally generate a torque. In the case where one of the two systems (relating to the steering of the wheels 12 or relating to the application of the operation reaction force) fails to operate, the other of the two systems that is not in failure can perform the steering of the wheels 12 or the application of the operation reaction force. Control necessary for the two systems and control in the failure condition are well known, and a detailed explanation thereof is dispensed with.

In the following explanation of each of the steering process and the reaction force process, there will be explained control executed by one of the two steering-related systems and control executed by one of the two reaction-force-related systems, each as a representative example. In the explanation, the respective constituent components in the two systems are referred generally to as the steering ECU 70S, the steering motor 24, the rotation angle sensor 72, the current sensor 74, the operation amount sensor 82, the steering amount sensor 76, the reaction force ECU 70C, the reaction force motor 62, the rotation angle sensor 78, and the current sensor 80.

i-a) First Steering Process

The first steering process is a process that achieves high controllability of the steering of the wheels 12. The ECU 70S, specifically, the computer of the ECU 70S, obtains an operation amount $\delta$ of the steering wheel 16 based on detection by the operation amount sensor 82 and determines a target steering amount $\theta^*$ as a steering amount $\theta$ to be achieved, based on the operation amount $\delta$ according to a set steering gear ratio (i.e., $\theta/\delta$) that is a design value set in the present steering system. The ECU 70S obtains an actual steering amount $\theta$ at the current time point based on detection by the steering amount sensor 76 and obtains a steering amount deviation $\Delta\theta$ that is a deviation of the actual steering amount θ from the target steering amount θ*. The ECU 70S determines, based on the steering amount deviation Δθ, a target supply current $I_S^*$ that is electric current to be supplied to the steering motor 24. In other words, the target supply current $I_S^*$ is determined by the following equation according to a PID control rule:

$$I_S^* = \alpha \cdot \Delta\theta + \beta \cdot d\Delta\theta + \gamma \cdot \int\Delta\theta$$

dΔθ: derivative value of the steering amount deviation Δθ
∫Δθ: integral value of the steering amount deviation Δθ
α: proportional term gain
β: derivative term gain
γ: integral term gain To supply the determined target supply current $I_S^*$ to the steering motor 24, the inverter as the drive circuit of the ECU 70S operates based on a rotation angle $R_S$ of the steering motor 24 detected by the rotation angle sensor 72 and electric current $I_S$ that is actually flowing in the steering motor 24 and detected by the current sensor 74.

In the first steering process, the steering of the wheels 12 is performed while detecting the actual steering amount θ. Thus, the steering is good in response and accuracy. While not explained in detail, the proportional term gain α, the derivative term gain β, and the integral term gain γ in the above equation for determining the target supply current $I_S^*$ may be varied in accordance with a running speed v of the vehicle detected by the vehicle speed sensor 84, lateral acceleration G based on detection by the lateral acceleration sensor 86, and so on, whereby the steering device 14 performs appropriate steering of the wheels 12 in accordance with the vehicle running state or the like. To phrase it simply, the steering device 14 performs steering with special characteristics and performance desired by the driver.

In the first steering process, the ECU 70S executes a steering process based on detections by the plurality of sensors. Specifically, the steering of the wheels 12 is controlled utilizing detection values of the two sensors relating to the steering amount θ, i.e., the steering amount sensor 76 and the rotation angle sensor 72. Specifically, a control loop (minor loop) of the rotation angle $R_S$ of the steering motor 24 based on detection by the rotation angle sensor 72 exists in a control loop (outer loop) of the steering amount θ based on detection by the steering amount sensor 76. Further, the procedure for determining the target supply current $I_S^*$ is complicated. Therefore, the processing amount of the ECU 70S in the first steering process is considerably large. Here, an execution cycle time is defined as a time taken by the ECU 70S for one execution of one process that is repeatedly executed. The execution cycle time of the first steering process needs to be made longer to a certain degree. While not explained in detail, it takes some time before the steering ECU 70S receives a detection signal of the steering amount θ from the steering amount sensor 76. This also inevitably leads to an increase in the execution cycle time of the first steering process. The longer execution cycle time is one demerit of the first steering process.

i-b) Second Steering Process

The second steering process is a comparatively simple process and cancels or offsets the demerit of the first steering process described above. The steering amount θ and the rotation angle $R_S$ of the steering motor 24 correspond relative to each other within a certain range though not corresponding strictly due to unavoidable factors that arise from the structure of the steering device 14 such as elongation of the timing belt 54, looseness or backlash in the constituent components such as the ball screw mechanism. In the second steering process, the steering of the wheels 12 is controlled utilizing the correspondence between the steering amount θ and the rotation angle $R_S$ of the steering motor 24 without utilizing the actual steering amount θ based on the result of detection by the steering amount sensor 76 as a part of the plurality of sensors. Specifically, a target rotation angle $R_S^*$ of the steering motor 24 theoretically corresponding to the target steering amount θ* is determined based on the operation amount δ of the steering wheel 16, and the inverter is operated such that appropriate electric current $I_S$ is supplied to the steering motor 24 based on the determined target rotation angle $R_S^*$ and the rotation angle $R_S$ of the steering motor 24 at the current time point detected by the rotation angle sensor 72.

According to the second steering process, the controllability, namely, the accuracy and the response of the steering, is not so high, but the control is simplified, so that the processing load of the steering ECU 70S is light. That is, the execution cycle time can be shortened in the second steering process.

i-c) Reaction Force Process

The reaction force process is executed by the reaction force ECU 70C. In the reaction force process, the reaction force ECU 70C obtains the operation amount δ of the steering wheel 16 based on detection by the operation amount sensor 82. On the basis of the obtained operation amount δ, the reaction force ECU 70C determines a target supply current $I_C^*$ that is electric current $I_C$ to be supplied to the reaction force motor 62, so as to apply, to the steering wheel 16, a torque in a direction to return the steering wheel 16 to the neutral position. Further, the inverter as the drive circuit of the reaction force ECU 70C operates based on the rotation angle $R_C$ of the reaction force motor 62 detected by the rotation angle sensor 78 and the electric current $I_C$ that is actually flowing in the reaction force motor 62 and detected by the current sensor 80. In this respect, the torque generated by the reaction force motor 62 is set so as to generally correspond to the electric current $I_C$ that is being supplied to the reaction force motor 62 and so as to be generally proportional to the operation amount δ, namely, the rotation angle of the steering wheel 16 from the neutral position.

The load of the reaction force ECU 70C in the reaction force process is comparatively small, and the execution cycle time of the reaction force process is shorter than that of the first steering process.

ii) Auxiliary Process

The present steering system executes, as the auxiliary process relating to the operation of the steering system, two processes, i.e., a system appropriateness determining process of determining whether or not the steering system is in a state in which the steering of the wheels 12 is appropriately performed and a breakdown-tendency recognition process of recognizing that the steering system has a tendency to break down. The system appropriateness determining process and the breakdown-tendency recognition process relate mainly to normality of the steering device 14 and are executed by each steering ECU 70S as the electronic control unit for controlling the steering device 14. Actually, the system appropriateness determining process and the breakdown-tendency recognition process executed in the steering ECU 70SA and those executed in the steering ECU 70SB differ in details. For simplification of explanation of the auxiliary process, the following explanation will be made assuming that the details of the system appropriateness determining process and the details of the breakdown-tendency recognition process are the same between the steering ECU 70SA and the steering ECU 70SB.

ii-a) System Appropriateness Determining Process

It is determined in the system appropriateness determining process whether or not appropriate steering of the wheels 12 is being performed by comparing: the steering of the wheels 12 based on the operation amount δ that is obtained based on the result of detection by the operation amount sensor 82, i.e., the steering of the wheels 12 by the second steering process; and the steering of the wheels 12 based on the obtained operation amount δ and the steering amount θ that is obtained based on the result of detection by the steering amount sensor 76, i.e., the steering of the wheels 12 by the first steering process. Specifically, if based on the obtained operation amount δ, a theoretical steering amount $θ_{TH}$, which is a theoretical value of the steering amount θ, is obtained according to the set steering gear ratio. When a difference between the theoretical steering amount $θ_{TH}$ and an actual steering amount θ detected by the steering amount sensor 76 is not smaller than a threshold difference, it is determined that the steering system is not in the state in which the steering of the wheels 12 is appropriately performed.

It is determined in the system appropriateness determining process that the steering system is not in the state in which the steering of the wheels 12 is appropriately performed also when the detection results of the two steering amount sensors 76a, 76b that correspond to the respective two systems differ from each other to not lower than a certain extent and also when the detection results of the two operation amount sensors 82a, 82b that correspond to the respective two systems differ from each other to not lower than a certain extent.

Though the system appropriateness determining process utilizes the detection result of the steering amount sensor 76, the process is comparatively simple. Accordingly, the load of the steering ECU 70S in the process is comparatively small. In other words, the execution cycle time of the system appropriateness determining process is comparatively short.

ii-b) Breakdown-Tendency Recognition Process

In the breakdown-tendency recognition process, it is detected whether or not a force that leads to the breakdown of the steering system is acting on the system. Especially, a force that acts on the steering device 14 is detected. In the case where the force, namely, the excessive input, is applied, cumulative application of the excessive input is stored in view of the possibility of occurrence of the breakdown of the steering device 14 by being damaged due to fatigue, for instance. Specifically, the number of times of applications of the excessive input is counted and stored as history. In the case where the cumulative application of the excessive input estimated as described below exceeds a set degree, in other words, in the case where the counted value of the number of times of applications of the excessive input exceeds a set value, it is determined that the steering system has a tendency to break down.

The excessive input to the steering device 14 is estimated based on a relationship between: a change in the steering amount θ obtained based on the result of detection by the steering amount sensor 76; and a change in the electric current $I_S$ that flows in the steering motor 24 and that is obtained based on the result of detection by the current sensor 74. For instance, in the case where excessive electric current $I_S$ flows through the steering motor 24 due to counter electromotive force, it is estimated that a large load acts on the steering device 14 due to relatively severe contact of the wheel 12 with a curb or the like. Further, in the case where large electric current $I_S$ is supplied to the steering motor 24 for a long time period when the wheels 12 are positioned at an end of a steering range of the steering device 14, namely, in a steering end state of the wheels 12, it is estimated that a large load acts on the steering device 14.

As described above, the manner of the estimation of the excessive input is complicated, and the estimation requires a difficult and time-consuming procedure such as differential operation processing. Though detailed explanation of the breakdown-tendency recognition process is omitted here, it involves such a complicated and difficult procedure, thus imposing, on the steering ECU 70S, a relatively large load by execution of the breakdown-tendency recognition process. In other words, the execution cycle time of the breakdown-tendency recognition process has to be inevitably long.

iii) Processing Load and Operation Mode of Controller

The controller 20, specifically, the two ECUs 70S of the controller 20, suffer from a relatively large load because of parallel execution of the main process and the auxiliary process. (Strictly, the main process and the auxiliary process are executed in a time division manner.) Especially when the first steering process as the main process and the breakdown-tendency recognition process as the auxiliary process are parallelly executed, the load is considerably large. Here, in the case where a processing amount of all processes executed by the steering ECU 70S per unit time is defined as an overall processing amount, the execution ratio is defined as a ratio of a processing amount of each process to be executed with respect to the overall processing amount. According to the definition, the execution ratio of the main process and the execution ratio of the auxiliary process can be defined. The controller 20 changes, in each of the two steering ECUs 70SA, 70SB, the details of the main process and the details of the auxiliary process executed by each of the two steering ECUs 70SA, 70SB so as to change the execution ratios of the main process and the auxiliary process, thus preventing the load imposed on the steering ECU 70S from becoming excessive. In other words, the load imposed on the controller 20 can be made comparatively small by changing the details of the main process and the details of the auxiliary process depending on circumstances, thus enabling use of simple and inexpensive ECU 70S and the controller 20.

The details of the main process are changed depending on which process/processes is/are to be executed as the main process among the processes described above, and the details of the auxiliary process are changed depending on which process/processes is/are to be executed as the auxiliary process among the processes described above. Specifically, two operation modes, i.e., a first mode and a second mode, are set as the operation mode of the controller 20, and the controller 20 is configured to operate in a selected one of the two operation modes. In the first mode, the steering ECU 70S executes the first steering process as the main process and the system appropriateness determining process as the auxiliary process. In the second mode, the steering ECU 70S executes the second steering process as the main process and both of the system appropriateness determining process and the breakdown-tendency recognition process as the auxiliary process. In either mode, the reaction force ECU 70C executes the reaction force process.

Figures 3A, 3B:
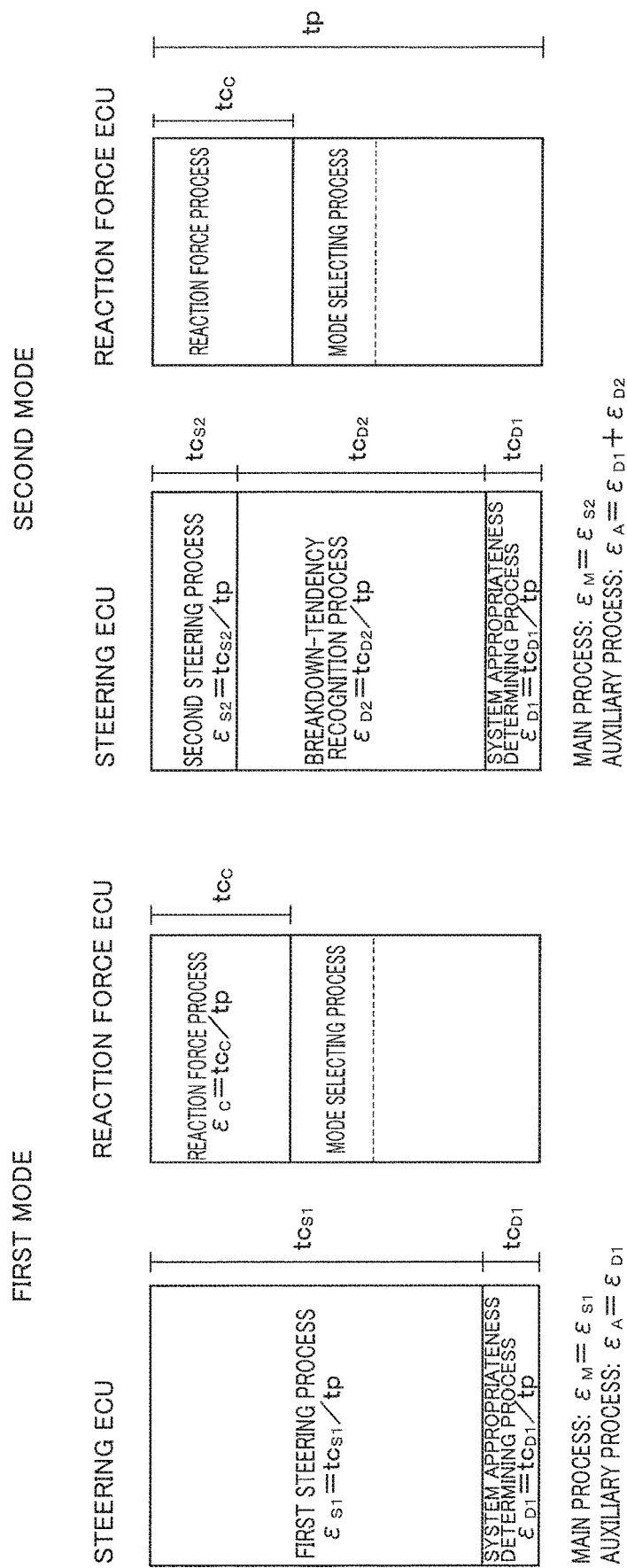
FIGS. 3A and 3B are charts for explaining that processes executed by the controller of the steering system in FIG. 1 differ depending on an operation mode of the controller, FIG. 3A being a chart for a first mode, FIG. 3B being a chart for a second mode.

The processes executed in each of the two operation modes are diagrammatically illustrated in FIGS. 3A and 3B. That is, the first mode is illustrated in a chart of FIG. 3A, and the second mode is illustrated in a chart of FIG. 3B. In the case where the controller 20 executes collectively all of the processes that should be executed, a time pitch of repetition of a set of the processes is referred to as an execution pitch tp, as illustrated in the charts. In the present controller 20, the execution pitch tp is the same between the two operation modes. The processes that should be executed are repeated at every execution pitch tp. Here, a time taken by execution of each process in the execution pitch tp is referred to as an execution cycle time tc. As illustrated in the charts, the execution cycle times tc of the first steering process, the second steering process, the system appropriateness determining process, the breakdown-tendency recognition process, and the reaction force process are respectively represented as $tc_{S1}$, $tc_{S2}$, $tc_{D1}$, $tc_{D2}$, $tc_C$. In the chart of FIG. 3A, a sum of the execution cycle time $tc_{S1}$ of the first steering process and the execution cycle time $tc_{D1}$ of the system appropriateness determining process in the first mode is treated as being equal to the execution pitch tp for easy understanding. Similarly, in the chart of FIG. 3B, a sum of the execution cycle time $tc_{S2}$ of the second steering process, the execution cycle time $tc_{D1}$ of the system appropriateness determining process, and the execution cycle time $tc_{D2}$ of the breakdown-tendency recognition process in the second mode is treated as being equal to the execution pitch tp for easy understanding.

When focusing on each ECU 70, the execution ratio £ of each process is regarded as the execution cycle time tc of each process with respect to the execution pitch tp. Specifically, the execution ratio $\varepsilon_{S1}$ of the first steering process, the execution ratio $\varepsilon_{S2}$ of the second steering process, the execution ratio $\varepsilon_{D1}$ of the system appropriateness determining process, the execution ratio $\varepsilon_{D2}$ of the breakdown-tendency recognition process, and the execution ratio $\varepsilon_C$ of the reaction force process are respectively regarded as $tc_{S1}/tp$, $tc_{S2}/tp$, $tc_{D1}/tp$, $tc_{D2}/tp$, $tc_C/tp$. Accordingly, the execution ratio $\varepsilon_M$ of the main process and the execution ratio $\varepsilon_A$ of the auxiliary process in the first mode in the steering ECU 70S are respectively represented as follows:

$$\varepsilon_M = \varepsilon_{S1}, \varepsilon_A = \varepsilon_{D1}$$

Further, the execution ratio $\varepsilon_M$ of the main process and the execution ratio $\varepsilon_A$ of the auxiliary process in the second mode in the steering ECU 70S are respectively represented as follows:

$$\varepsilon_M = \varepsilon_{S2}, \varepsilon_A = \varepsilon_{D1} + \varepsilon_{D2}$$

It is noted that the execution cycle time $tc_{S2}$ of the second steering process executed in the second mode is shorter than the execution cycle time $tc_{S1}$ of the first steering process executed in the first mode and that the breakdown-tendency recognition process is not executed in the first mode. As apparent from this, the execution ratio $\varepsilon_M$ of the main process is lower and the execution ratio $\varepsilon_A$ of the auxiliary process is higher in the second mode than those in the first mode. In the above explanation, the execution ratio £ of each process for each steering ECU 70S has been explained. It is needless to mention that the execution ratio $\varepsilon_M$ of the main process is lower and the execution ratio $\varepsilon_A$ of the auxiliary process is higher in the second mode than those in the first mode also when focusing on the controller 20 as a whole, i.e., all of the four ECUs 70.

iv) Switching of Operation Mode

Changing of the execution ratio $\varepsilon_M$ of the main process and the execution ratio $\varepsilon_A$ of the auxiliary process, namely, switching of the operation mode between the first mode and the second mode, is executed based on at least one of the operating state of the steering system, the surrounding environment of the vehicle 10, and the running state of the vehicle 10. Viewed differently, the first steering process should be executed in a high-controllability required situation in which high controllability is required for the steering of the wheels 12, and the controller 20 operates in the first mode so as to increase the execution ratio of the main process. Further, the breakdown-tendency recognition process should be executed in a situation in which there is a possibility of application of an external force that leads to the breakdown of the steering system, and the controller 20 operates in the second mode so as to increase the execution ratio of the auxiliary process.

Specifically, the steering system is regarded as being in the high-controllability required situation when the running speed v of the vehicle 10 is not lower than a threshold speed $v_0$, namely, when the vehicle 10 is running at a relatively high speed. In the high-controllability required situation, it is unlikely that the steering of the wheels 12 is performed such that the steering amount θ becomes large, so that a large force is not required for the steering of the wheels 12. Further, in the high-controllability required situation, it is unlikely that a large external force is applied to the steering device 14. Accordingly, the controller 20 operates in the first mode. In a state in which the vehicle 10 is running straightforward, namely, in a state in which the steering amount θ is regarded as being equal to 0, the response when the steering starts is important, and it is unlikely that a large external force is applied to the steering device 14. Accordingly, the controller 20 operates in the first mode. In this respect, whether or not the steering amount θ is regarded as being equal to 0 may be determined based on whether or not the steering amount θ is smaller than a steering amount $θ_0$ that is set as a small value.

On the other hand, the steering system is configured such that the breakdown-tendency recognition process is executed only in a situation in which it is estimated that the possibility of application of a large external force to the steering device 14 is high, namely, only in an excessive input situation, even when the running speed v of the vehicle 10 is lower than the threshold speed $v_0$ and the wheels 12 are being steered. This is because the present steering system intends to perform high-quality steering as long as possible. Specifically, it is only in the following cases, for example, that the controller 20 operates in the second mode: a case in which the wheels 12 are being steered in a state in which the vehicle 10 is not running; a case in which the lateral acceleration G obtained based on detection by the lateral acceleration sensor 86 is not increasing in spite of an increase in the steering amount θ, namely, a case in which the wheels 12 are further steered in spite of the fact that the side force acting on the wheels is saturated; a case in which each wheel 12 is located at a position near to an end in the steerable range (steering end), namely, a case in which the wheels 12 are fully steered; and a case in which the steering amount θ corresponding to an increase in the operation amount δ of the steering wheel 16 is not attained, namely, a case in which one of the wheels 12 comes into contact with a curb or the like.

As explained above, the second steering process is for controlling the steering amount θ in dependence on the motor rotation angle $R_S$ detected by the rotation angle sensor 72 of the steering motor 24 without utilizing the result of detection by the steering amount sensor 76. Thus, in the case where the steering system is in a state in which it is estimated that a difference between the steering of the wheels 12 by the first steering process utilizing the result of detection by the steering amount sensor 76 and the steering of the wheels 12 by the second steering process is out of a permissible range, the second steering process is prohibited from being executed. (Hereinafter, this situation will be referred to as "steering-difference generation state" where appropriate.) That is, the controller 20 operates in the first mode even if the steering system is in the excessive input situation described above. In this respect, whether or not the steering system is in the steering-difference generation state is determined based on a difference between the steering amount θ based on detection by the steering amount sensor 76 and the steering amount θ estimated based on the motor rotation angle $R_S$ obtained by detection by the rotation angle sensor 72.

v) Flow for Switching Operation Mode

Figure 4:
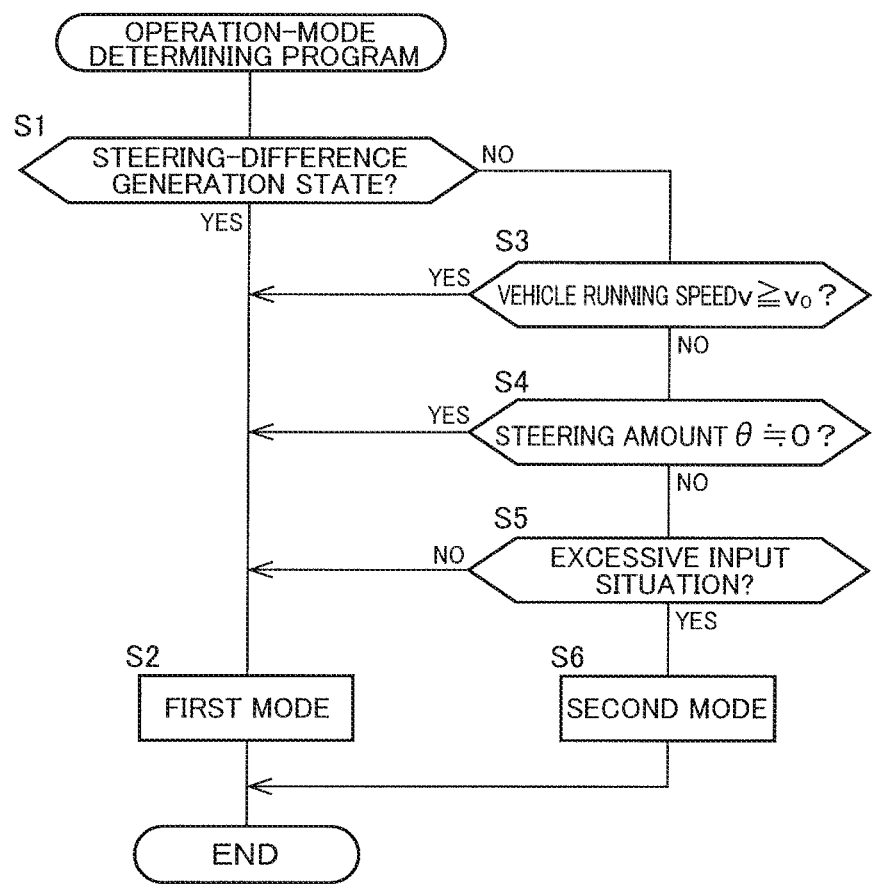
FIG. 4 is a flowchart indicating a program executed for determining the operation mode.

Switching of the operation mode of the controller 20 between the first mode and the second mode is executed such that the controller 20 executes an operation-mode determining program indicated by a flowchart of FIG. 4. The operation-mode determining program is a process that involves a short execution cycle time. Accordingly, as illustrated in the charts of FIG. 3, the program is executed in the execution pitch tp by the reaction force ECU 70C (one of the reaction force ECU 70CA and the reaction force ECU 70CB) that can afford a processing capacity. The execution pitch tp is set to about 0.5 msec-10 msec, for instance. Referring to the flowchart, there will be hereinafter briefly explained a process according to the operation-mode determining program.

In the process according to the operation-mode determining program, it is initially determined at Step 1 whether or not the steering system is in the steering-difference generation state described above. (Step 1 is abbreviated as "S1". Other steps will be similarly abbreviated.) When the steering system is in the steering-difference generation state, the first mode is determined as the operation mode at S2 so as to prohibit execution of the second steering process.

When the steering system is not in the steering-difference generation state, it is determined at S3 whether or not the running speed v of the vehicle 10 obtained based on detection by the vehicle speed sensor 84 is not lower than the threshold speed $v_0$. When the running speed v is not lower than the threshold speed $v_0$, namely, when the vehicle 10 is running at a relatively high speed, it is recognized that the steering system is in the high-controllability required situation. In this case, the first mode is determined as the operation mode at S2. On the other hand, when the running speed v of the vehicle is lower than the threshold speed $v_0$, it is determined at S4 whether or not the steering amount θ obtained based on detection by the steering amount sensor 76 is substantially 0. In the case whether the vehicle 10 is deemed to be running straightforward, it is recognized that the steering system is in the high-controllability required situation. In this case, the first mode is determined as the operation mode at S2.

When the running speed v of the vehicle 10 is lower than the threshold speed $v_0$ and the wheels 12 are being steered, it is determined at S5 whether or not the steering system is in the excessive input situation described above. When it is determined that the steering system is in the excessive input situation, the second mode is determined as the operation mode at S6 for executing the breakdown-tendency recognition process. When it is determined that the steering system is not in the excessive input situation, the first mode is determined as the operation mode at S2 for maintaining high-quality steering characteristics.

As explained above, the operation modes are changed depending on circumstances, namely, the respective execution ratios of the main process and the auxiliary process executed by the controller 20 are changed, making it possible to prevent the processing load of the controller 20 from becoming excessive. That is, by increasing the execution ratio of the main process depending on circumstances, the steering of the wheels 12 can be accurately performed. On the other hand, by decreasing the execution ratio of the main process depending on circumstances, the main process can be simply executed. Further, by increasing the execution ratio of the auxiliary process depending on circumstances, the details of the auxiliary process can be made advanced one. On the other hand, by decreasing the execution ratio of the auxiliary process depending on circumstances, the auxiliary process that is with low necessity of execution can be dispensed with or can be simplified.

What is claimed is:

1. A steering system of a vehicle comprising:
    an operation member configured to be operated by a driver;
    a steering device configured to steer a wheel; and
    a controller configured to control the steering system,
    wherein the controller is configured to parallelly execute a main process and an auxiliary process,
    wherein the main process comprises a process in which the controller controls the steering device to perform steering of the wheel in accordance with an operation of the operation member,
    wherein the auxiliary process relates to an operation of the steering system and comprises a breakdown-tendency recognition process of recognizing that the steering system has a tendency to break down,
    wherein the controller is further configured to change an execution ratio of the main process and an execution ratio of the auxiliary process, wherein the execution ratio of the main process is a ratio of a processing amount of the main process to an overall processing amount, wherein the execution ratio of the auxiliary process is a ratio of a processing amount of the auxiliary process to the overall processing amount, and wherein the overall processing amount is an amount of all processes executed by the controller per unit time, and
    wherein the breakdown-tendency recognition process includes a process of determining that the steering system has the tendency to break down based on a cumulative application of an external force that leads to a breakdown of the steering system.

2. The steering system according to claim 1, wherein the auxiliary process further includes a system appropriateness determining process of determining whether or not the steering system is in a state in which the steering of the wheel is appropriately performed.

3. The steering system according to claim 1, wherein the controller is configured to change the execution ratio of the main process and the execution ratio of the auxiliary process based on at least one of an operating state of the steering system, a surrounding environment of the vehicle, and a running state of the vehicle.

4. The steering system according to claim 1, wherein the controller is configured to increase the execution ratio of the main process when a running speed of the vehicle is not lower than a threshold speed.

5. The steering system according to claim 1, wherein the controller is configured to increase the execution ratio of the main process when the vehicle is running straightforward.

6. The steering system according to claim 1,
    wherein the auxiliary process includes the breakdown-tendency recognition process, and
    wherein the controller is configured to increase the execution ratio of the auxiliary process in a third situation in which it is expected that there is a possibility of an application of an external force that leads to a breakdown of the steering system.

7. The steering system according to claim 1, wherein the controller is configured to increase the execution ratio of the main process in a high-controllability required situation in which high controllability is required for the steering of the wheel.

8. The steering system according to claim 1,
wherein the controller is configured to be operable in a first mode and operable in a second mode in which the execution ratio of the main process is set to be lower than that in the first mode and the execution ratio of the auxiliary process is set to be higher than that in the first mode, and
wherein the controller is configured to switch an operation mode thereof between the first mode and the second mode.

9. The steering system according to claim 1, wherein the controller is configured to change the execution ratio of the main process and the execution ratio of the auxiliary process by changing at least one of details of the main process and details of the auxiliary process.

10. The steering system according to claim 9,
wherein the controller is configured to selectively execute, as at least a part of the main process, one of:
a first steering process in which the controller controls the steering device to perform the steering of the wheel based on detection by a plurality of sensors; and a second steering process in which the controller controls the steering device to perform the steering of the wheel based on detection by a part of the plurality of sensors, and
wherein the controller is configured to execute the first steering process when increasing the execution ratio of the main process and to execute the second steering process when decreasing the execution ratio of the main process.

11. The steering system according to claim 10, wherein the controller is configured not to execute the second steering process when the steering system is in a state in which a difference between the steering of the wheel by the first steering process and the steering of the wheel by the second steering process is out of a permissible range.

12. A steering system of a vehicle comprising:
an operation member to be operated by a driver;
a steering device configured to steer a wheel; and
a controller configured to control the steering system,
wherein the controller is configured to parallelly execute a main process and an auxiliary process,
wherein the main process comprises a process in which the controller controls the steering device to perform steering of the wheel in accordance with an operation of the operation member,
wherein the auxiliary process relates to an operation of the steering system and comprises a system appropriateness determining process of determining whether or not the steering system is in a state in which the steering of the wheel is appropriately performed by comparing the steering of the wheel based on an operation amount detected by a first sensor and the steering of the wheel based on an actual steering amount detected by a second sensor different from the first sensor,
wherein the controller is further configured to change an execution ratio of the main process and an execution ratio of the auxiliary process, wherein the execution ratio of the main process is a ratio of a processing amount of the main process to an overall processing amount, wherein the execution ratio of the auxiliary process is a ratio of a processing amount of the auxiliary process to the overall processing amount, and wherein the overall processing amount is an amount of all processes executed by the controller per unit time.

13. The steering system according to claim 12, wherein the controller is configured to change the execution ratio of the main process and the execution ratio of the auxiliary process based on at least one of an operating state of the steering system, a surrounding environment of the vehicle, and a running state of the vehicle.

14. The steering system according to claim 12, wherein the controller is configured to increase the execution ratio of the main process when a running speed of the vehicle is not lower than a threshold speed.

15. The steering system according to claim 12, wherein the controller is configured to increase the execution ratio of the main process when the vehicle is running straightforward.

16. The steering system according to claim 12, wherein the controller is configured to increase the execution ratio of the main process in a high-controllability required situation in which high controllability is required for the steering of the wheel.

17. The steering system according to claim 12,
wherein the controller is configured to be operable in a first mode and operable in a second mode in which the execution ratio of the main process is set to be lower than that in the first mode and the execution ratio of the auxiliary process is set to be higher than that in the first mode, and
wherein the controller is configured to switch an operation mode thereof between the first mode and the second mode.

18. The steering system according to claim 12, wherein the controller is configured to change the execution ratio of the main process and the execution ratio of the auxiliary process by changing at least one of details of the main process and details of the auxiliary process.

19. The steering system according to claim 18,
wherein the controller is configured to selectively execute, as at least a part of the main process, one of:
a first steering process in which the controller controls the steering device to perform the steering of the wheel based on detection by a plurality of sensors; and a second steering process in which the controller controls the steering device to perform the steering of the wheel based on detection by a part of the plurality of sensors, and
wherein the controller is configured to execute the first steering process when increasing the execution ratio of the main process and to execute the second steering process when decreasing the execution ratio of the main process.

20. The steering system according to claim 19, wherein the controller is configured not to execute the second steering process when the steering system is in a state in which a difference between the steering of the wheel by the first steering process and the steering of the wheel by the second steering process is out of a permissible range.

* * * * *